March 1, 1932.  W. L. PADEN  1,848,080

SALES ADDER AND RECORDER

Filed April 9, 1921  12 Sheets-Sheet 1

Witness:
James Hutchinson

Inventor:
William Leonard Paden
By Milano & Milano Attorneys

March 1, 1932. W. L. PADEN 1,848,080
SALES ADDER AND RECORDER
Filed April 9, 1921 12 Sheets-Sheet 2
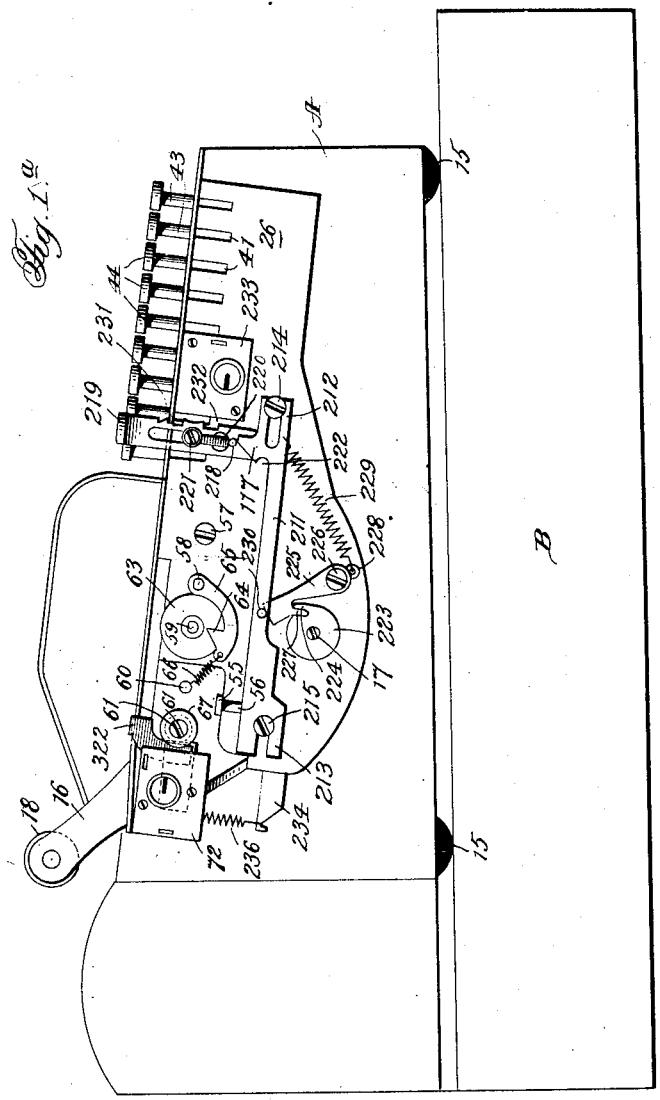
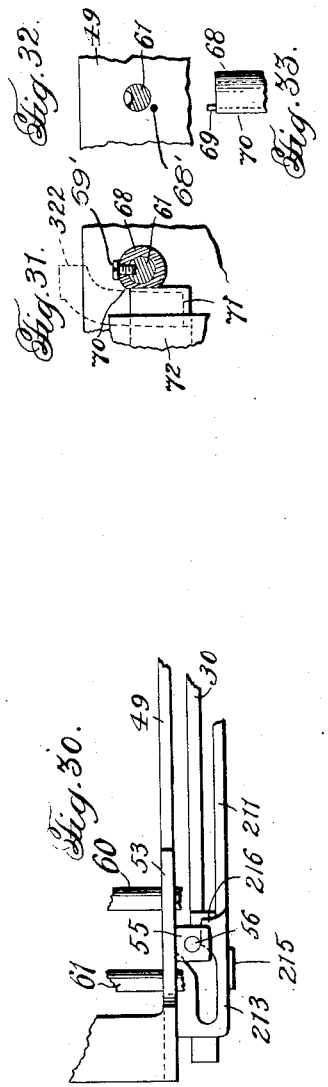
Inventor:
William Leonard Paden,
By Milans & Milans Attorneys
Witness:
Jas E Hutchinson March 1, 1932. W. L. PADEN 1,848,080
SALES ADDER AND RECORDER
Filed April 9, 1921 12 Sheets-Sheet 3
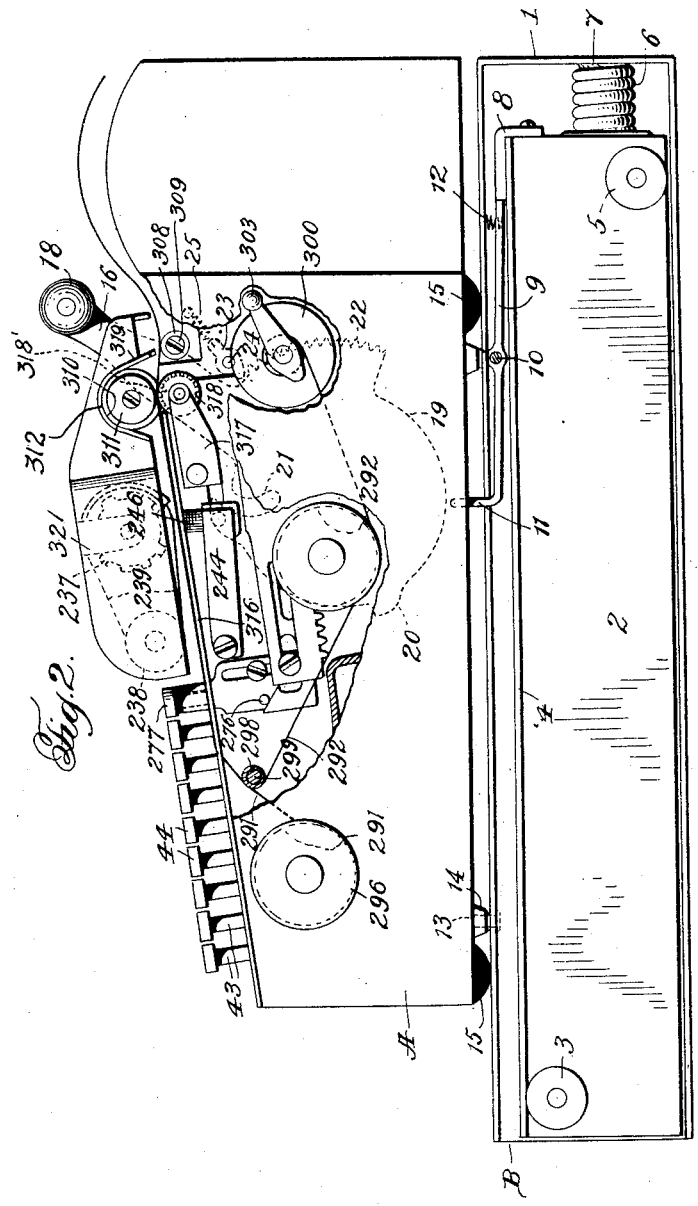

March 1, 1932. W. L. PADEN 1,848,080
SALES ADDER AND RECORDER
Filed April 9, 1921 12 Sheets-Sheet 4
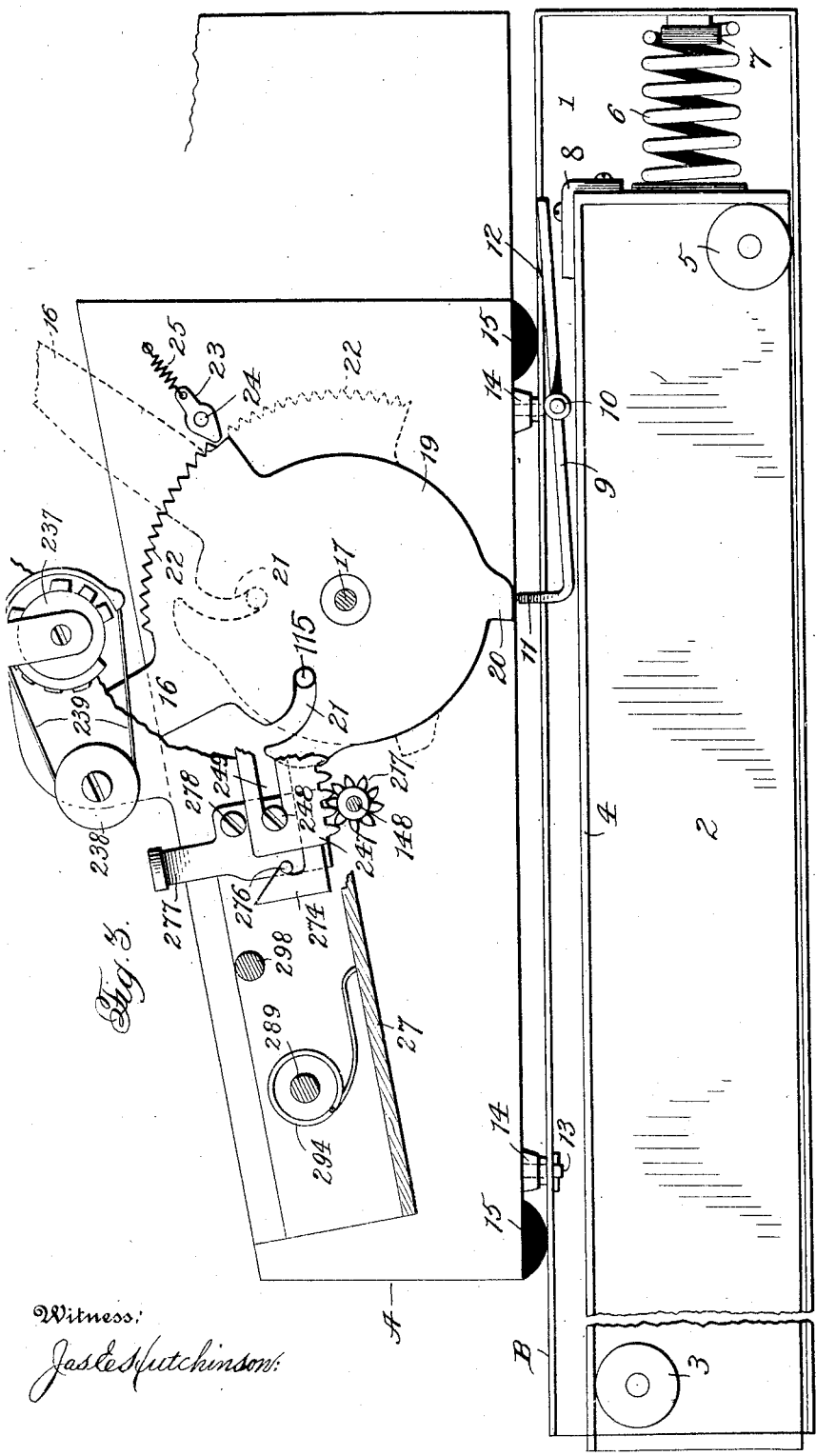

March 1, 1932.  W. L. PADEN  1,848,080
SALES ADDER AND RECORDER
Filed April 9, 1921   12 Sheets-Sheet 5
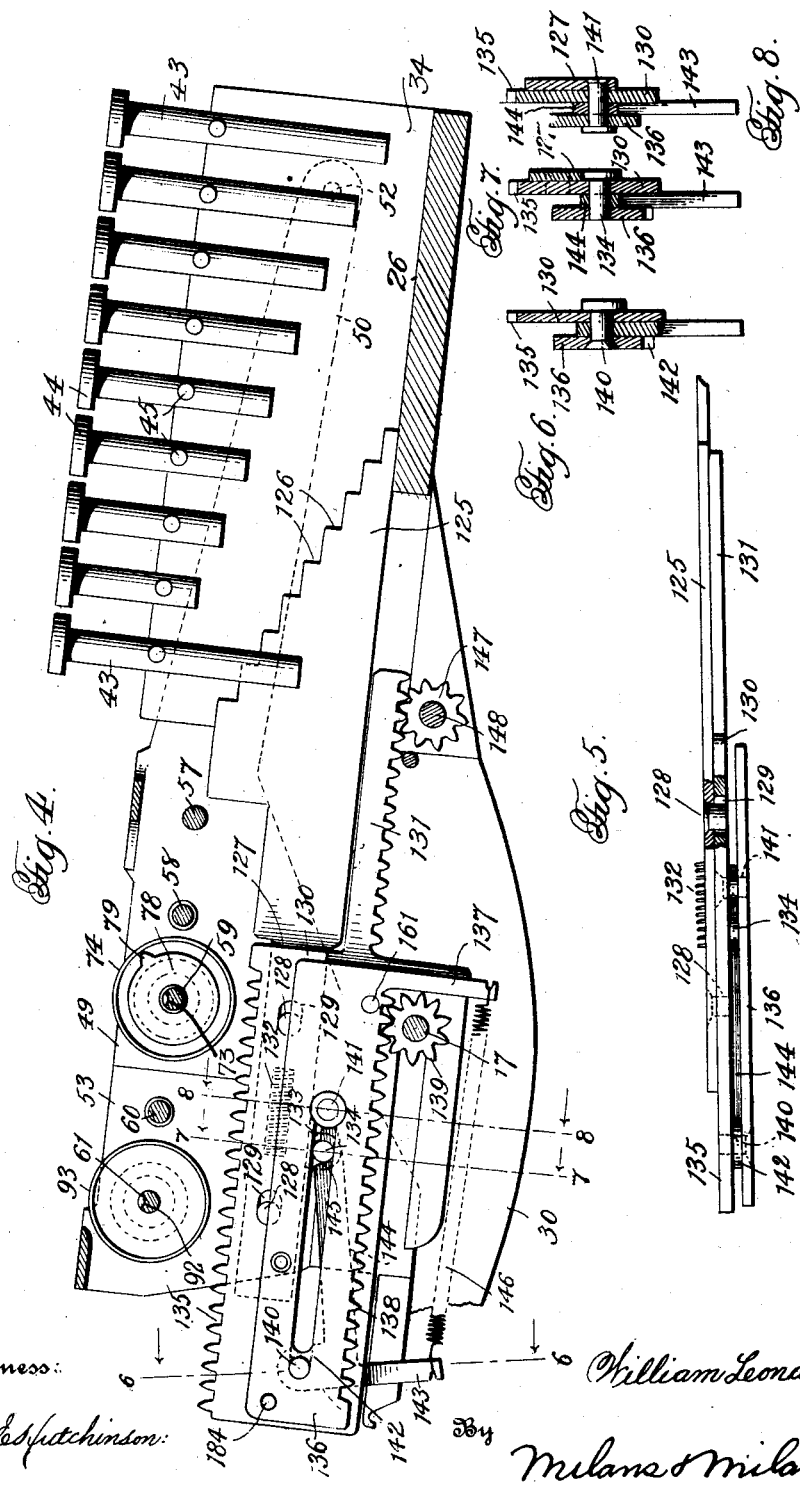

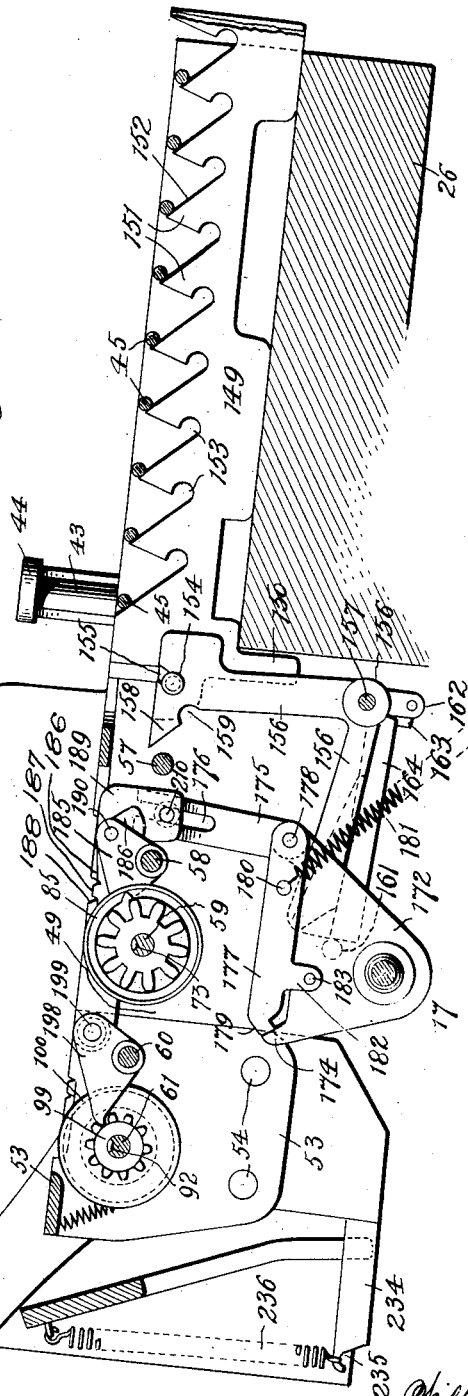

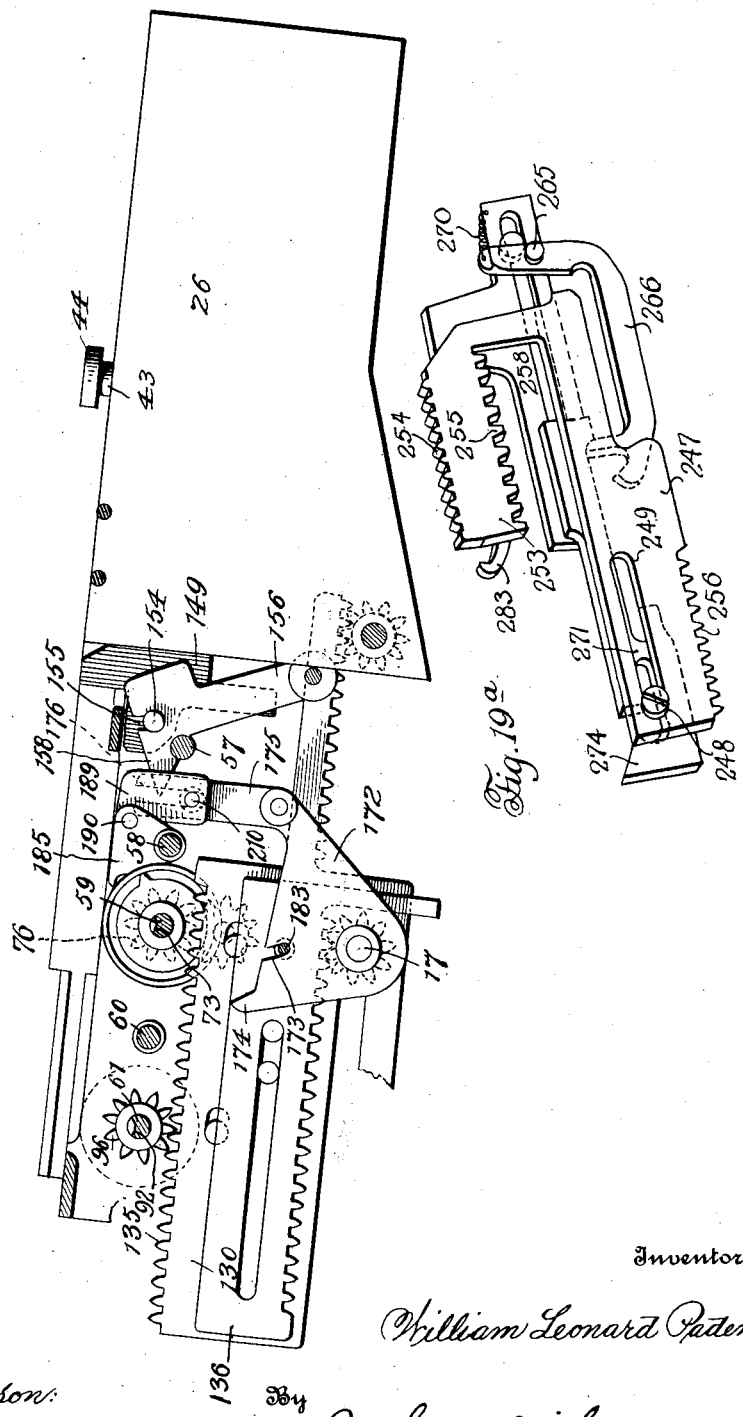

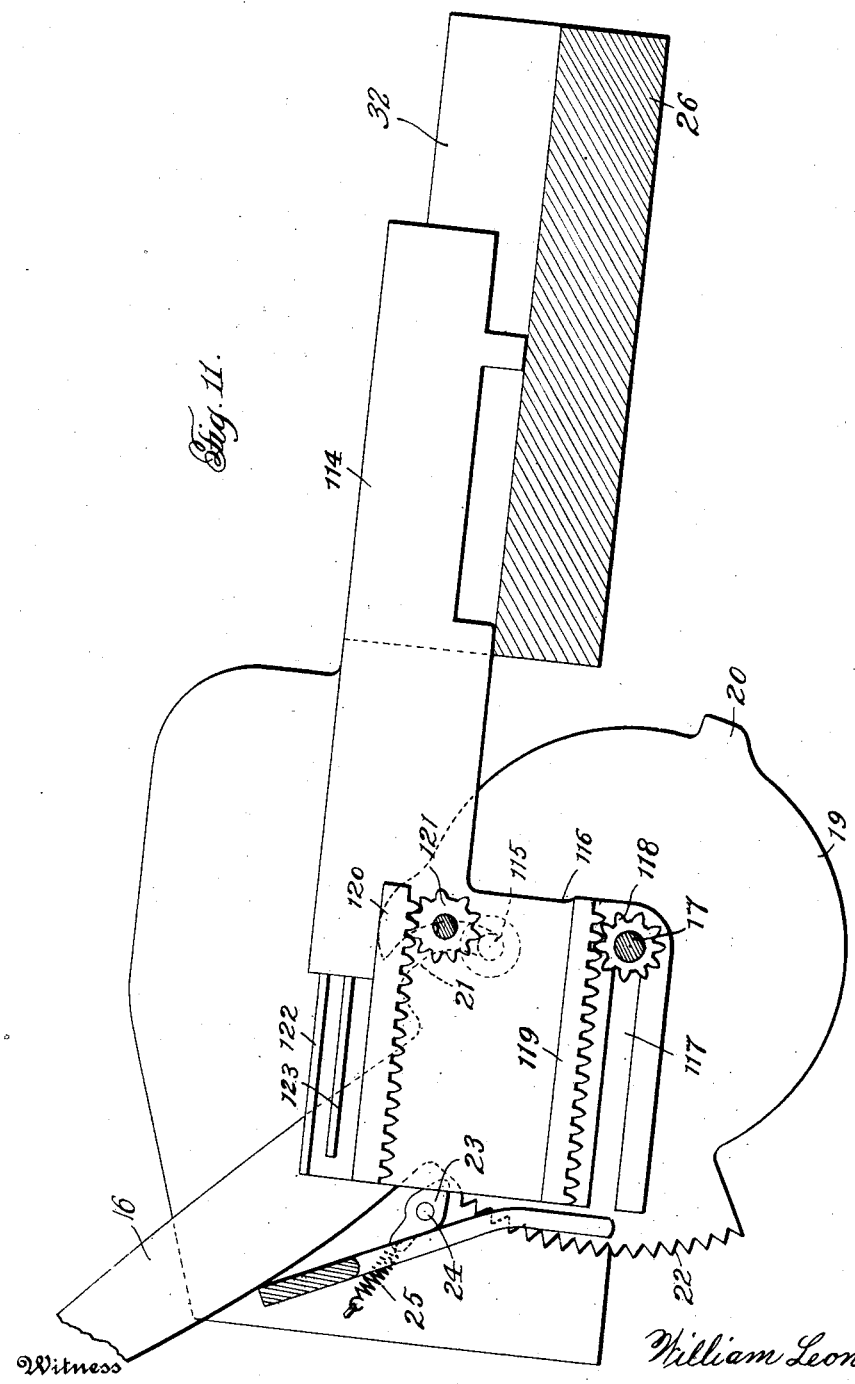

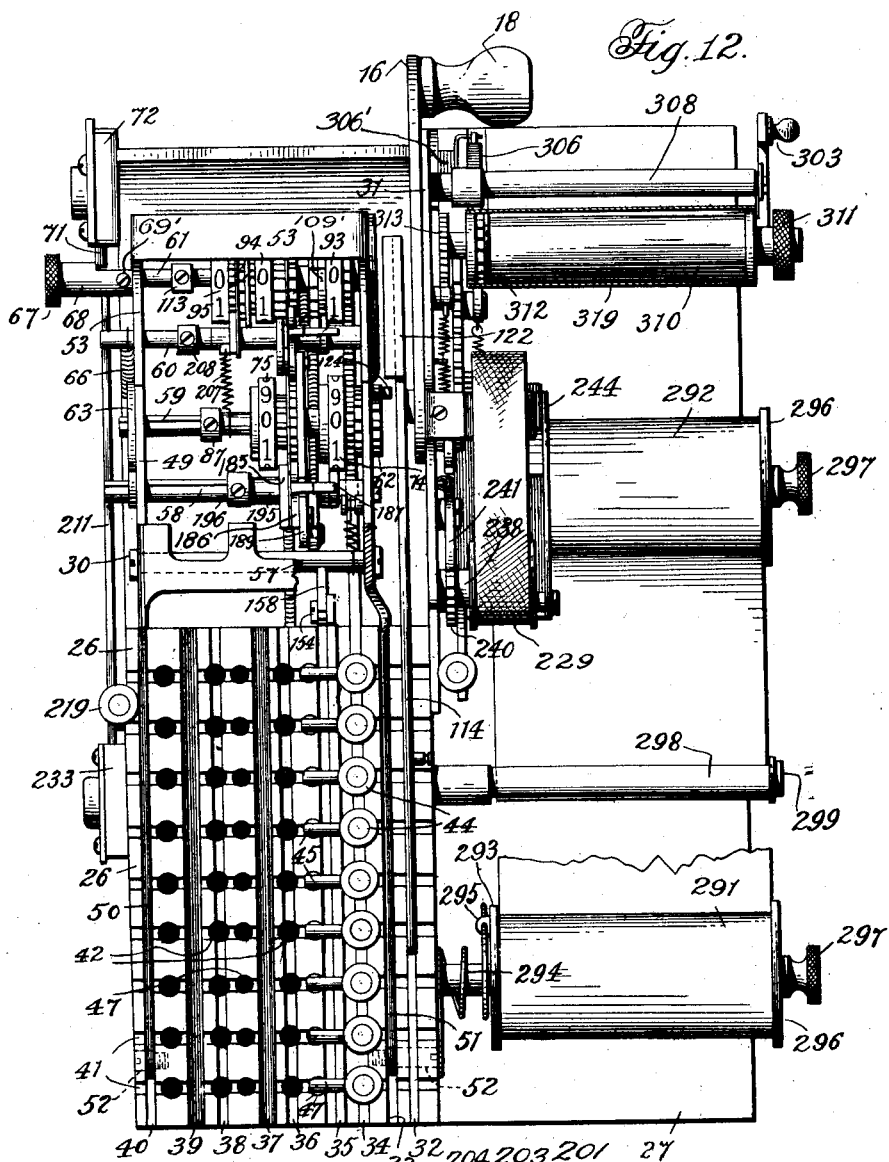

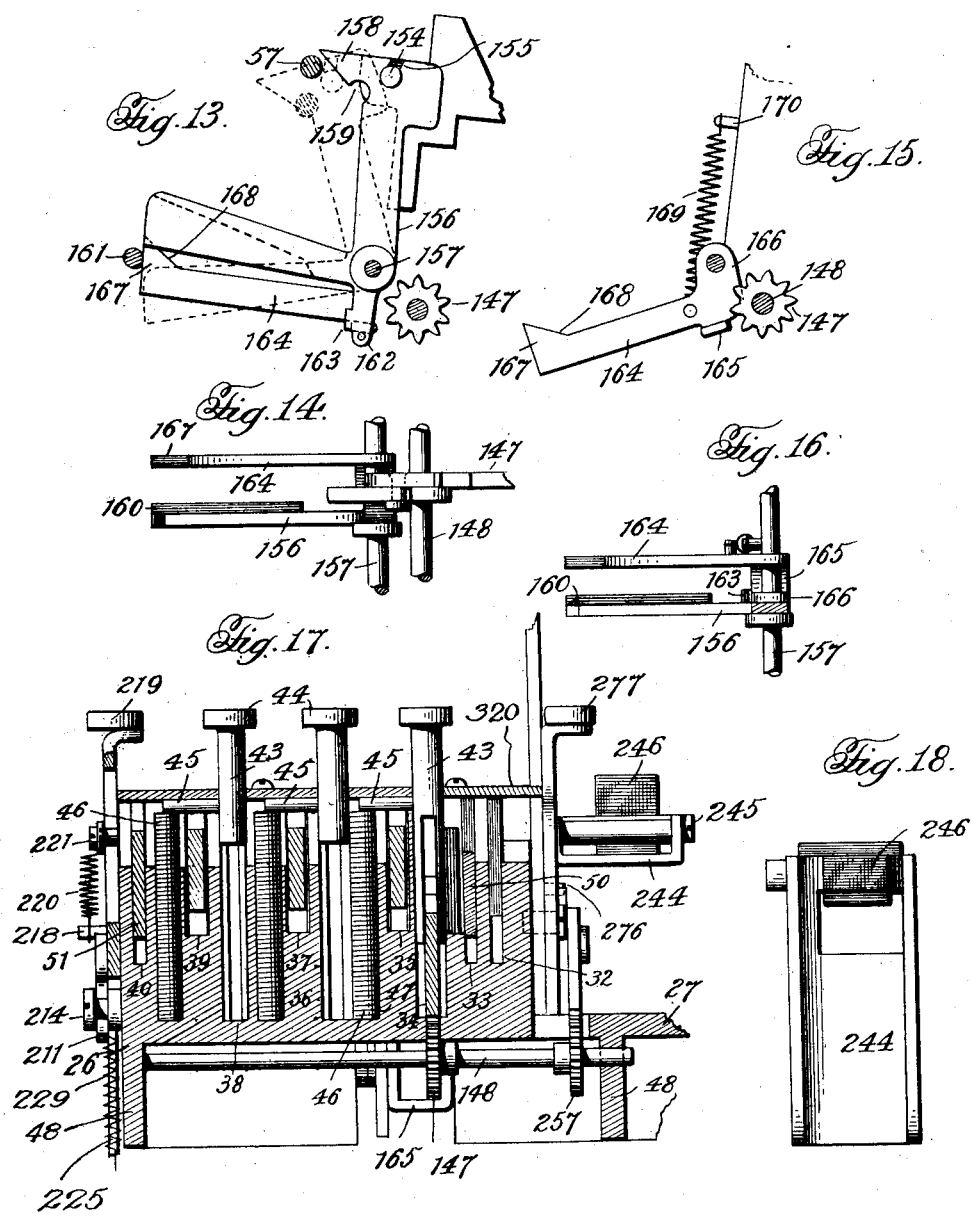

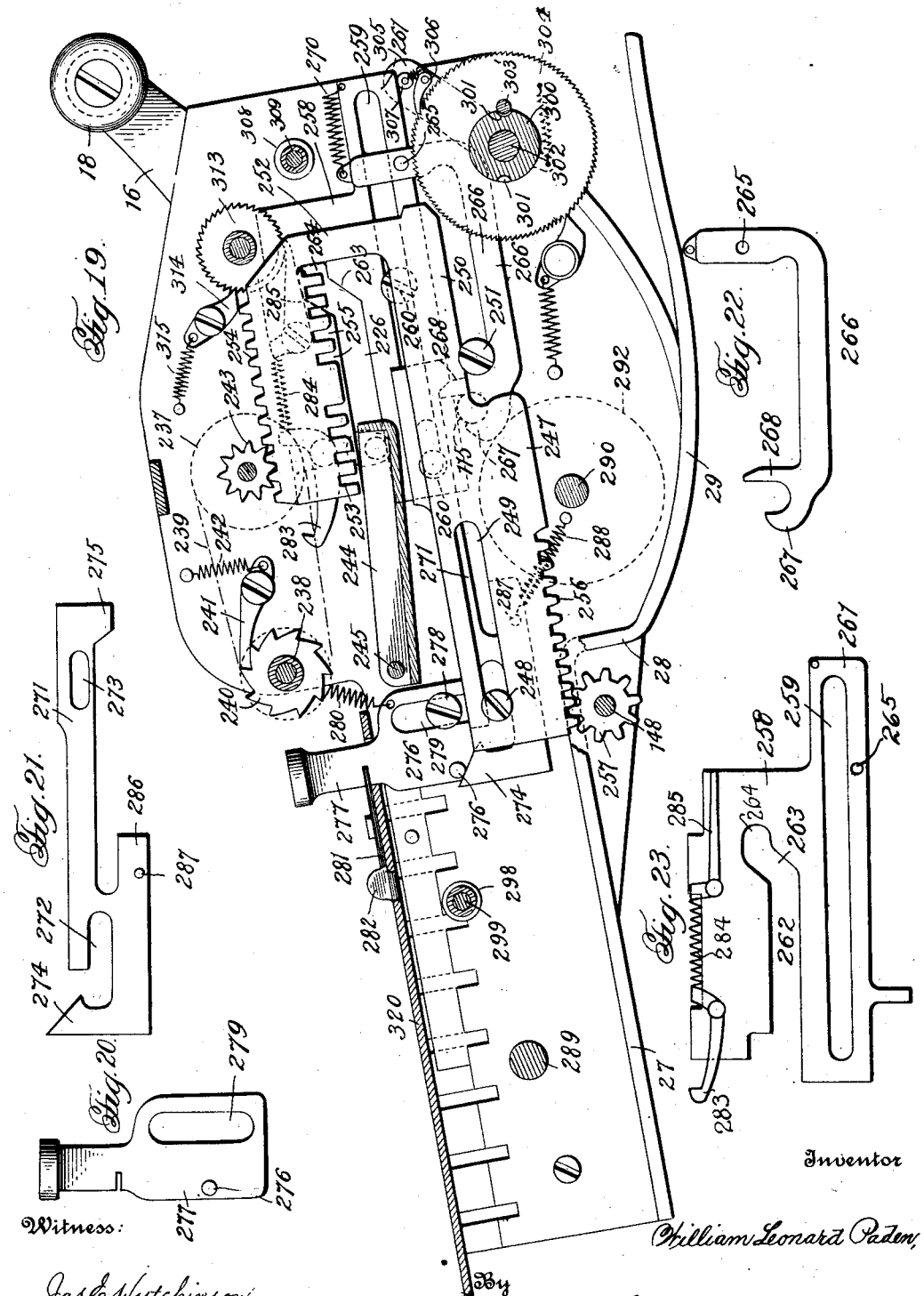

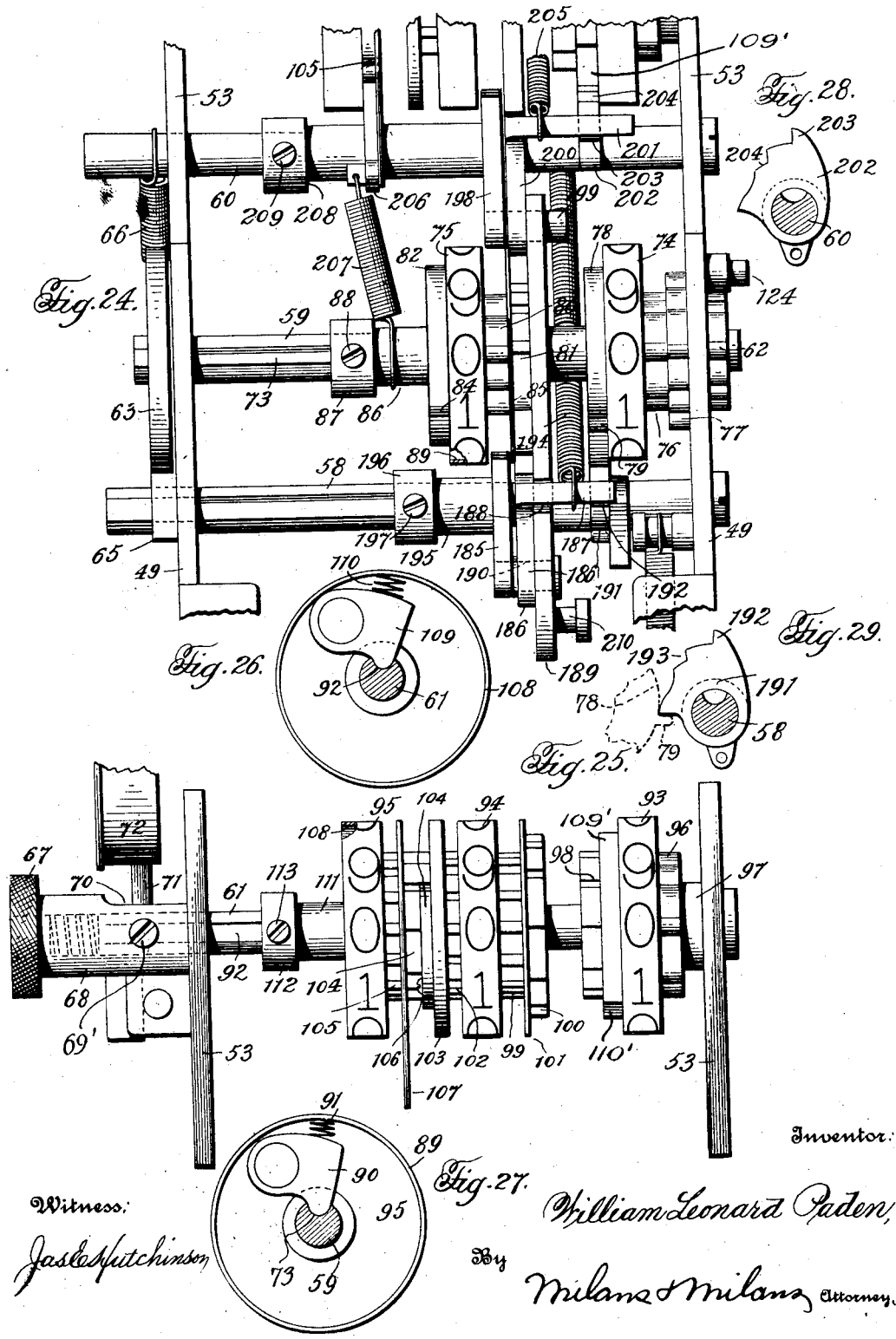

Patented Mar. 1, 1932

1,848,080

UNITED STATES PATENT OFFICE

WILLIAM LEONARD PADEN, OF SAGINAW, MICHIGAN

SALES ADDER AND RECORDER

Application filed April 9, 1921. Serial No. 459,838.

My invention relates to new and useful improvements in a sales adder and recorder and has for its principal object the provision of a device of this character which is small and compact in form whereby it is easily portable from one place to another.

Another object resides in the idea of providing a machine which will add the amounts of an individual purchase, add the amount of the total sales for the day, and print a sales slip, in duplicate, said sales slip bearing the price of each individual article and the total amount of the purchase, the original slip being handed to the purchaser and the duplicate being wound upon a suitable spool from which it may be taken at the end of the day, and the amounts transferred, by the bookkeeper, to any form of permanent record.

A further object consists in constructing the machine in such a manner that it may, if desired, be used in connection with a cash drawer, said drawer normally being held within the drawer casing or housing and adapted to be released by the operation of the machine.

The invention has for still another object the provision of mechanism whereby the total day-adder may be locked in operative or inoperative position and whereby the printing or recording mechanism may be thrown into inoperative position so that the machine may be used simply as an adding machine without recording.

With the above and other objects in view which will appear as the description proceeds, my invention consists of the novel details of construction and arrangement of parts which will be clearly understood from the following specification and claims, and while I have illustrated the preferred embodiment of my invention, it will be understood that such changes may be made as will fall within the scope of the appended claims.

In the drawings,

Fig. 1 (a) is a side elevation of the machine shown supported upon a cash drawer;

Fig. 2 is a side elevation of the opposite side of the machine, as shown in Fig. 1, the cash drawer casing or housing being shown in longitudinal vertical section, and the cash drawer with its holding and releasing mechanism in side elevation;

Fig. 3 is a longitudinal vertical section through the machine and cash drawer, showing in detail the operating lever and mechanism for releasing the cash drawer, and a portion of the recording or printing attachment lock-out mechanism;

Fig. 4 is a fragmental longitudinal vertical section through the machine showing in side elevation the adding rack and graduated slide for limiting the movement of the rack;

Fig. 5 is a fragmental top plan of the driving rack and graduated slide;

Fig. 6 is a transverse vertical section on the line 6—6 of Fig. 4, looking in the direction of the arrow;

Fig. 7 is a transverse vertical section on the line 7—7 of Fig. 4, looking in the direction of the arrow;

Fig. 8 is a transverse vertical section on the line 8—8 of Fig. 4, looking in the direction of the arrow;

Fig. 9 is a fragmental longitudinal vertical section showing a side elevation of the mechanism for lowering the frame carrying the adding discs and mechanism for transferring from one adding disc to another;

Fig. 9a is a detail of the latch used in connection with the transfer mechanism.

Fig. 10 is a fragmental longitudinal section showing the frame carrying the adding discs in lowered position.

Fig. 11 is a fragmental longitudinal section showing a side elevation of the operating lever and resetting rack and gear;

Fig. 12 is a top plan with the top or covering plates removed;

Fig. 13 is a detail side elevation of the catch for holding the adding disc-carrying frame in lowered position;

Fig. 14 is a top plan of the construction illustrated in Fig. 13;

Fig. 15 is a detail side elevation of the arm for holding or releasing the adding rack;

Fig. 16 is a top plan of the construction illustrated in Fig. 15;

Fig. 17 is a transverse vertical section showing the operating key and associated parts;

Fig. 18 is a top plan of the printing hammer;

Fig. 19 is a longitudinal section showing in side elevation the printing or recording mechanism with its associated and operating parts;

Fig. 19a is a detail of parts of the printing mechanism.

Figs. 20, 21 and 22 are details of parts for making the printing or recording mechanism inoperative;

Fig. 23 is a side elevation of the plate for raising and lowering the printing hammer;

Fig. 24 is a fragmental top plan of the counting wheels and associated parts;

Fig. 25 is a fragmental top plan of the total day-adder with its resetting and locking mechanism;

Figs. 26 and 27 are side elevations of the adding wheels;

Figs. 28 and 29 are side elevations of the arms used in the transferring mechanism;

Fig. 30 is a fragmental top plan of the mechanism for throwing the auxiliary frame into inoperative position; and Figs. 31, 32 and 33 are details used in the resetting of the total day-adder.

Fig. 34 is a detailed side elevation of one of the adding wheels of the total day counter with its associated parts.

Figure 1:
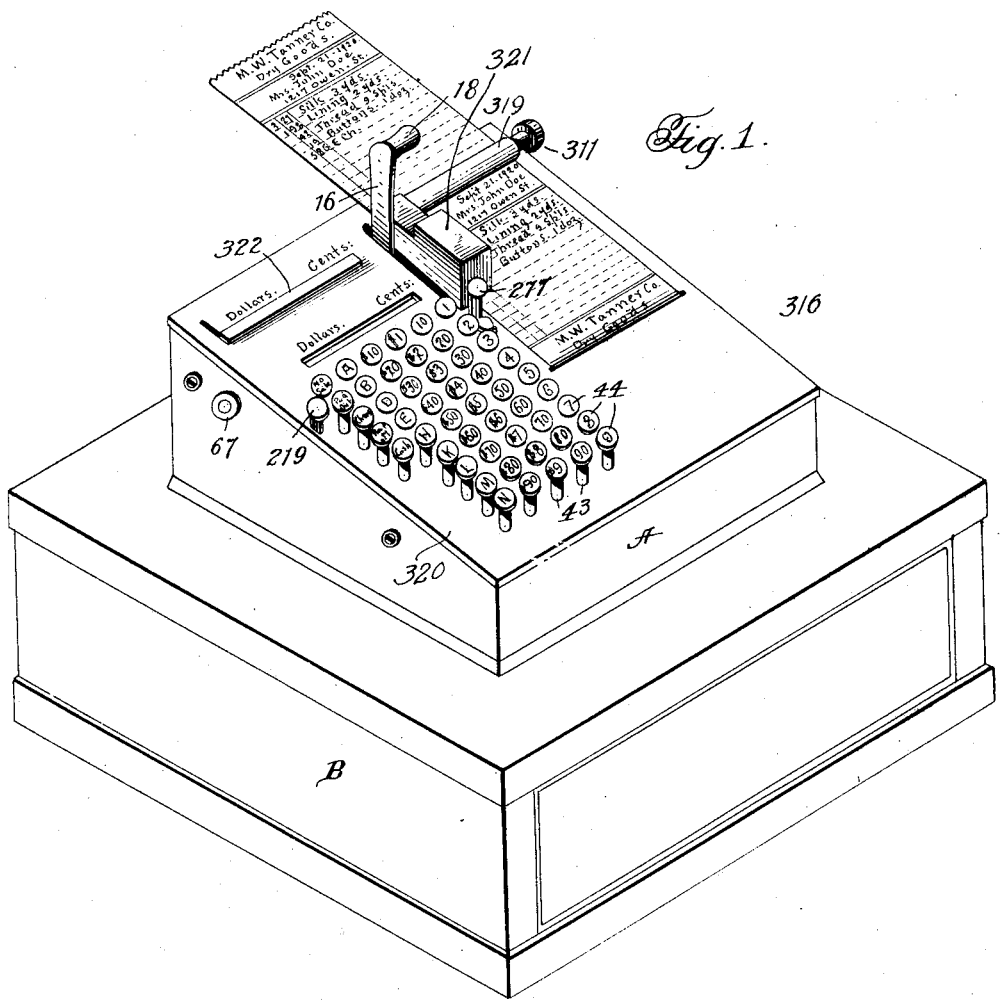
Fig. 1 is a perspective showing my machine mounted on a cash drawer.

My sales adder and recorder is especially adapted to all businesses that issue sales slips or checks and instead of issuing a slip or check merely giving the total amount of purchase, as is the custom in cash registers now commonly upon the market, issues a slip or check itemizing the articles purchased, giving the cost of each individual article and the total cost of the various articles. As previously stated, the machine may be used either with or without a cash drawer and is of such a size that it may be readily carried from place to place. The top of the machine is of such a size as to form a surface for writing on the sales slip and is so inclined that writing will be easy. Two or more rolls of paper will be carried by the machine, one roll furnishing paper for the original slip, and the other roll or rolls the duplicate slips. The original slip is to be given to the customer, whereas the duplicate will be wound upon another roll so that it may be removed at any desired time for inspection or to have the bookkeeper enter into a permanent record. With the slips in proper position, the clerk writes thereon the articles purchased and then by operating the machine in a manner to be later described, the purchase price of each article is printed alongside of the article. At the same time two sets of counters will be operated to add, within sight, the total amount of the purchase. After each individual amount has been printed, one set of counters may be thrown out and the total amount of the purchase, on the other set of counters printed on the slip. That set of counters thrown out is what may be termed the "total day-counter" on which the entire sales for the day are added.

I provide a blind for the "total day-counter" so that the amount registered thereon can not be read until a lock, to be later described, is operated.

The other counter is reset to 0 after each purchase, the sales slips are automatically fed during the record of the individual amounts, and a cutter is provided for tearing off the original to be given to the purchaser. While I have illustrated the machine as operated by hand, it will be understood that it might equally as well be operated by an electric or other motor. With this general description I will now proceed to describe my construction and operation in detail.

In the drawings, my improved machine is indicated, generally, at A, and the support therefor at B. Figs. 1, 2, and 3, of the drawings, show the support in the form of a cash drawer and housing, but I wish it understood that any other suitable form of support may be used, if desired. For instance, the machine might be placed upon a table, counter, or supported upon a suitable frame or stand.

The drawer housing is shown at 1 and the cash drawer at 2. The housing is open at the front end so that the drawer may slide therefrom. A roller 3 is mounted in the housing, at each side adjacent the forward end, and the drawer 2 is provided on each side, at the top edge, with a longitudinally extending flange 4 which operates over the rollers 3. These flanges 4 may be formed an integral part of the drawer or may be secured thereto in any desired manner. Rollers 5 are secured to each side of the drawer, adjacent the rear edge thereof, and operate on the bottom of the drawer housing 1, as more particularly shown in Figs. 2 and 3 of the drawings. A coiled spring 6 is secured to the rear end of the drawer and surrounds a bumper 7 which is preferably of rubber. When the drawer is pushed into the housing, as shown in Fig. 2, the spring will engage the rear end of the housing and be compressed. An angle-iron strip or plate 8 is secured to the top of the drawer, at the rear end, and as shown, one end of the plate or strip extends a short distance over the upper surface of the drawer to be engaged by the end of a catch 9 pivoted within the housing at 10. The forward end of the catch 9 is bent upwardly at right angles to form the extension 11 which passes through an opening in the top of the housing and through an opening in the bottom of the machine A. It will be understood that the machine will be positioned upon the housing so that the opening in the bottom thereof will aline with the opening in the top of the housing. The openings in both the bottom of the machine and top of the housing will be of sufficient diameter to allow the extension 11 to operate freely therein. A coiled spring 12 is supported between the top of the housing and catch 9 and engages the upper face of the catch between the pivot 10 and rear end thereof. This spring will normally hold the rear end of the catch down as shown in Fig. 2.

Pins 13 are secured to the top of the housing 1 and extend upwardly therefrom to be received in sockets 14 formed on or secured to the under side of the machine A. The pins, if desired, may be adjustable and when received in the sockets will hold the machine against longitudinal or transverse movement upon the support. It will be understood, however, that when desired the machine may be easily lifted off the support and carried where desired. Rubber foot pieces 15 are also secured to the under side of the machine to prevent marring or scratching of the surface of the support.

An operating lever 16 is pivotally connected to the shaft 17 and extends through an elongated opening formed in the top of the machine. A handle 18 is secured to the upper end of the lever and extends at right angles thereto. The lower end of the lever is enlarged as shown at 19, and is provided on its outer periphery with a cam projection 20 which is adapted to engage the right angle extension 11, on the catch 9, when the lever is operated. A curved slot 21 is formed in the enlarged portion 19, from its outer edge, for a purpose to be later described, and a toothed segment 22 is formed around a portion of the periphery adjacent the lever 16. A pawl 23 is pivoted to the machine at 24 and is normally held in the position shown in Figs. 2 and 3, by the coiled spring 25, one end of which is connected to the pawl and the opposite end to the machine. The pawl engages the toothed segmental portion 22 and is used to prevent a partial operation of the lever. When the lever is started in one direction, the pawl will swing upon the pivot and thereby require a full stroke of the lever before it can be operated in the opposite direction. In other words, it will be seen that the direction of operation of the lever cannot be changed until the pawl has passed over beyond the ends of the toothed portion. Said pawl will be normally held out of engagement with the teeth and will not engage the same until the lever is operated.

From the above, it will be seen that the cash drawer may be released by the operation of the lever 16. The drawer will normally be in the position shown in Fig. 2, with the catch 9 engaging the end of the plate or strip 8, with the spring 6 under compression, and the drawer held entirely within the housing. When the lever 16 is operated, the cam projection 20 will engage the right-angle extension 11, on the end of the catch, swing the catch on the pivot 10, and disengage the opposite end of the catch from the plate or strip 8. The spring 6 will expand and force the drawer beyond the front end of the housing so that access may be had thereto. When the catch 9 is operated, it will place the spring 12 under compression so that when the drawer is again pushed into the housing the catch will automatically engage the plate or strip 8. The rollers 3 and 5 will allow the drawer to freely slide without binding within the housing. The bumper 7 will prevent undue jar when returning the drawer to the housing.

The machine is formed with a casting 26 having an outwardly-extending flange 27 formed on one side adjacent the bottom edge. The flange is bent downwardly intermediate its ends, as shown at 28, more particularly in Fig. 19 of the drawings, and is curved as indicated at 29 to make room for working the parts. The casting 26 is also provided with rearwardly-extending arms 30 and 31 Fig. 12 between which mechanism to be later described is mounted and adapted to be operated. Longitudinally-extending grooves 32, 33, 34, 35, 36, 37, 38, 39, and 40 are formed in the casting 26 and extend from the upper face thereof to a point adjacent the bottom. Transversely-extending grooves 41 are also formed in the casting and intersect the longitudinally-extending grooves as more clearly shown in Fig. 12. These transversely-extending grooves, like the longitudinally-extending grooves, extend from the upper surface of the casting but are not necessarily as deep as the longitudinally-extending grooves. The longitudinally-extending grooves 34, 36, and 38 are each provided with longitudinally-spaced circular enlargements 42 adapted to receive the shanks 43 of the keys 44, as more particularly shown in Fig. 17 of the drawings. Each of the key shanks 43 is provided with a transversely-extending pin 45, adjacent its ends, and these pins extend through the transversely-extending grooves and engage the upper ends of coiled springs 46 received in circular openings 47 formed in the casting between the grooves 35 and 36, 37 and 38, and 39 and 40. The pins are of sufficient length to extend over the longitudinally-extending grooves 35, 37 and 39 for a purpose to be later described. The keys 44 will bear any suitable or desired designation marks. The casting 26 is further formed with downwardly-extending flanges 48, at each side, as clearly shown in Fig. 17 of the drawings, to support the machine and the shaft 148.

A frame 49 (Figs. 4, 9, and 12) is pivotally connected to the casting 26 and operates between the rearwardly-extending arms 30 and 31 of said casting. The frame is provided with forwardly-extending arms 50 and 51 which are received in the longitudinally-extending grooves 39 and 40, respectively, of the casting, and are pivotally connected to the casting at 52 by pins, screws, or the like, which pass into the casting and through holes formed in the arms. An auxiliary frame 53 is carried by studs 54 (Fig. 9) on the main frame and an ear 55 (Figs. 1a and 30) is formed on the outer face of the auxiliary frame and carries a downwardly-extending pin 56. This pin 56 is adapted to be engaged for moving the auxiliary frame transversely with respect to the main frame in a manner and for a purpose to be later described. Transversely-extending shafts 57, 58, and 59 (Figs. 4, 9 and 10) are carried by the main frame 49 and similar shafts 60 and 61 are carried by the auxiliary frame 53. The ends of the shaft 59 extend beyond the sides of the frame, a gear-wheel 62 (Figs. 12 and 24) being connected to the inner end of the shaft, on the outside of the frame, and a disc 63 is connected to the outer end, on the outside of the frame. The disc 63 (Fig. 1a) is provided on its outer periphery with a notch adapted to receive the pointed projection 64 of a pawl 65 carried on the outer end of the shaft 58. A coiled spring 66 is secured to the free end of the pawl and to the end of the shaft 60 of the auxiliary frame to normally hold the point 64 in the notch. A handhold 67 is secured to the outer end of the shaft 61, on the outside of the auxiliary frame. This hand-hold has a sleeve 68 which receives the end of the shaft and is slidable on said shaft. A pin 69 is formed on the inner end of the sleeve and is adapted to be received in an opening 68' in the auxiliary frame. One face of the sleeve is flattened, as shown at 70, to be engaged by the sliding bolt 71 of a key-controlled lock 72 which is secured to the side of the machine frame as more particularly illustrated in Figs. 1a and 12 of the drawings. A spring (shown in dotted lines Fig. 25) is secured inside of the sleeve 68 to normally hold the parts in the position shown in Fig. 12 with the pin 69 within the frame opening. The spring will be operated and placed under tension when the handhold 67 and sleeve 68 are drawn away from the frame to release the pin 69 so that when the handhold is released the spring will again draw the sleeve with its projection 69 inwardly towards the frame to engage the pin 69 in its receiving opening. When it is desired to rotate the shaft 61, for a purpose to be later described, the lock 72 is operated to withdraw the sliding bolt 71 from engagement with the flattened surface 70 of the sleeve. The hand-hold is then grasped and the sleeve drawn outwardly until the pin 69 is removed from the opening. When this has been done, the shaft may be rotated. When the pin is again brought into alinement with the opening, the hand-hold will be released and the spring will force the pin into the opening. The sleeve 68 is held against rotation on the shaft 61 by the screw 69', the inner end of the screw entering the groove 92' formed in the shaft 61.

The shaft 59 is provided with the longitudinally extending groove 73 and loosely mounted on the shaft are the counting discs 74 and 75. Secured to one face of the disc 74 is a gear-wheel 76 and a ratchet-wheel 77, and secured to the opposite face is a disc 78 having a projection 79 formed on its outer periphery. Secured to one face of the disc 75 are the gear-wheel 80 and the ratchet wheel 81, while secured to the opposite face is a disc 82. A projection 84 is formed on the outer periphery of the disc 82, and a spacing plate or washer 85 is provided between the gear 80 and ratchet 81 to act as a guide for the transfer portion and overthrowing portions 185 and 198. This plate or washer is of greater diameter than the gear and ratchet-wheels. A spacing sleeve 86 engages the outer face of the disc 82 and a collar 87 engages the opposite end of the sleeve and is secured to the shaft 59 by means of a screw 88. Each of the counting discs 74 and 75 is provided with a horizontally-extending flange 89 (Fig. 27), and pivotally connected to the disc, beneath the flanges 89, are the pawls 90, the outer ends of which are held against the shaft by means of the coiled springs 91. While I have only illustrated two counting discs, with their associated parts, it will be understood that any number might be used, according to the size of the machine.

The shaft 61 is provided with a longitudinally-extending groove 92 and loosely mounted on the shaft are the counting wheels or discs 93, 94, and 95. Formed on one face of the disc 93 are the gear-teeth 96 with the extension 97 adapted to engage the side of the frame and act as a spacing member. Positioned on the opposite face of the disc and adapted for operation therewith is the ratchet-wheel 98. Pivotally connected to the face of the disc 93 is an arm 109' having at its free end a projection 110' and intermediate its ends a projection 109a adapted to normally ride around the shaft 61 but being received in the recess 92 when resetting the adding disc or wheel in a manner to be later described. A coiled spring 109'' normally urges the arm towards the shaft. The counting disc 94 has formed on one face the gear 99 and ratchet 100, with a spacing plate or washer 101 therebetween. On the opposite face is the gear 102 and plate 103 having a pawl 104 pivotally connected thereto and spring-pressed. The plate 103 rotates with the counter wheel 94 and the pawl 104 which is pivotally connected to the plate 103 naturally rotates therewith and is adapted to be engaged with the ratchet wheel 106, which is secured to the face of the counter wheel 95, to carry over from the counter wheel 94 to the counter wheel 95. The counter disc 95 has formed on or secured to one face the gear 105 and ratchet 106, with the spacing plate or washer 107 therebetween. This washer 107 is carried by the shaft 60 and the pawl 104 is adapted to engage the ratchet 106. Each of the counting discs 93 and 94 is provided with a horizontal flange 108, and a pawl 109 is pivoted to the face of the disc beneath the flange of the discs 94 and 95. The free end of the pawl is held in contact with the shaft by means of the coiled spring 110. A sleeve 111 engages the outer face of the counting disc 95, and the sleeve in turn is engaged by a collar 112 secured to the shaft by a screw 113. While I have illustrated three counting discs on the shaft 61, it will be understood that any desired number of discs might be used with their associated parts. The counting discs on each of the shafts 59 and 61 will rotate with the shaft when the free end of the pawls 90 and 109 are held in the grooves 73 and 92, respectively. However, the discs may be independently operated by a mechanism and in a manner to be later described.

The counting discs on the shaft 59 are used for adding the amount of the individual purchase, whereas those on the shaft 61 are used for adding the total purchases of the day. The discs on shaft 59 will be returned to 0 after adding each individual purchase, but those on the shaft 61 will not be returned to 0 until the end of the day or such other time as might be desired.

Slidably mounted in the longitudinally-extending groove 32 (Figs. 11 and 12) of the base casting 26, is the forward end of a plate 114, said plate having on one face a pin or projection 115 adapted to be received in the arcuate slot 21 of the enlarged portion 19 of the lever 16, whereby the plate will be slid upon the operation of the lever. The rear end of the plate is provided with the downwardly-extending extension 116 in which is formed the slot 117 which extends from the rear end. The shaft 17 upon which the lever 16 is pivoted extends through the slot, as is more particularly shown in Fig. 11 of the drawings, and secured to this shaft is a gear-wheel 118 which meshes with the rack 119 formed on the face of the extension 116 just above the slot 117. A rack 120 is formed adjacent the upper rear edge of the plate and has meshing therewith a gear-wheel 121 which in turn is adapted to be meshed with the gear wheel 62 secured to the shaft 59. These several features and the relative arrangement thereof are shown in Figs. 10, 11 and 12 to which reference should be made. The gear-wheel 121 is rotatably mounted on the side of the frame 49 and when the lever 16 is operated it will slide the plate 114 which in turn will rotate the gear-wheels 121 and 62 and shaft 59 thereby setting the counting disc on said shaft to 0. Flanges 122 and 123 are formed adjacent the upper rear edge of the plate and form guides for a pin or lug 124 secured at the upper edge of one side of the frame 49 as more clearly shown in Fig. 12 for a purpose to be later described.

Slidable in the longitudinal groove 34 of the base 26 is a plate 125 (Figs. 4 and 12) having the upper edge stepped as shown at 126 and the rearward extension 127 having the longitudinally-spaced pins 128 which are received in the elongated openings 129 of the plate 130 having the forwardly-extending rack 131. A coiled spring 132 is secured to the plates 130 and 125 and normally tends to hold the plate 125 forward with respect to the plate 130, the pins 128 being positioned in the rear ends of the slots 129 so that when the plate 130 is moved forward, in a manner to be later described, it will also carry forward the plate 125. A downwardly-extending lug 133 is formed on the lower edge of the extension 127 of the plate 125, and has the pin 134 extending at right angles thereto and through an elongated slot in the plate 130. The upper edge of the plate 130 is provided with the teeth 135 for a purpose which will later appear. A plate 136 having an elongated slot therein is slidably mounted relative to the plate 130 and has a downwardly-extending arm 137 at its forward end and teeth 138 along its lower edge. These teeth 138 mesh with the gear 139 secured to the shaft 17. A pin 140 is carried by the plate 136 and operates in the elongated slot formed in the plate 130 and a pin 141 is carried by the plate 130 and operates in the elongated slot formed in the plate 136, these pins slidably mounting the plates for movement one relative to the other. This construction and arrangement is more particularly illustrated in Figs. 5, 6, 7, and 8 of the drawings.

Pivotally mounted on the pin 140, between the plates 130 and 136, is a latch 142 having the downwardly-extending arm 143 and the substantially horizontally-extending arm 144 with a notch 145 formed in the upper edge adjacent the forward end adapted to normally receive the pin 134 carried by the lug 133 of the extension 127 of the plate 125. A coiled spring 146 is connected to the downwardly-extending arm 137 of the plate 136 and the downwardly-extending arm 143 of the latch 142 and holds the end of the horizontal arm upwardly with the notch 145 receiving the pin 134. The rack 131, on the plate 130, engages a gear-wheel 147 secured to a shaft 148 which extends transversely under the rear end of the casting 26. While I have only described one plate 125, with its associated plates and parts, it will be understood that a similar plate will be mounted in each of the slots 36 and 38 of the casting 26. When the keys 44 are depressed, their shanks 43 will engage the steps 126 of the plate 125 and thereby limit the sliding movement of said plate in a manner to be later described in detail.

Slidably mounted in each of the slots 35, 37 and 39 of the casting 26, is a plate 149, and as these plates are similarly constructed and have similar associated parts, a description of one will suffice to give a clear understanding thereof. A downwardly-extending arm 150 is formed on the rear end of the plate and is adapted to engage the rear end of the casting 26, as more particularly shown in Fig. 9, to limit the forward movement of the plate. The upper edge of the plate is cut to form a plurality of projections 151 having their forward edges inclined, as shown at 152, and terminating into rounded recesses or pockets 153. The forward inclined edges of these projections are adapted to be engaged by the pins 45 formed on the shanks 43 of the keys 44, and when the keys are depressed, the pins will ride on the inclined faces thereby forcing the plate 149 rearwardly. On the limit of movement, the pins will be received in the rounded recesses or pockets 153. A laterally projecting pin 154 is secured to the face of the plate 149, adjacent the rear end, and is received in the slot 155 formed in the upper end of the vertical arm of a bell-crank lever 156 pivoted on a shaft 157. A bevelled projection 158 is formed on the vertical arm of the bell-crank lever and terminates into a semi-circular recess 159. When the plate 149 is slid rearwardly, it rocks the bell-crank lever on its pivot so that the inclined projection 158 engages the shaft 57 carried by the frame 49 and thereby lowers said frame, the shaft being received in the semi-circular recess 159 so as to hold the frame in lowered position. The horizontal arm of the bell-crank lever is formed with a laterally-extending flange 160 (Fig. 14) to be engaged by a pin 161 (Fig. 4) formed on the face of the plate 136. A downwardly-extending lug 162 is formed on the lower end of the bell-crank lever and has an inturned lip 163 adapted to engage the end of a latch arm 164 pivotally mounted on the shaft 157 adjacent the bell-crank lever. The forward end of this latch arm is bent to form the horizontal portion 165 and the vertical portion 166 the forward edge of which is engaged by the lip 163 of the bell-crank lever, as more clearly shown in Fig. 16. The rear end of the latch arm is formed with the upwardly-extending projection 167 having its edge inclined as shown at 168. A coiled spring 169 normally holds the arm 164 up, one end of the spring being connected to the arm and the opposite end to a pin 170 secured to the end of the casting 26. When in raised position, the projection 167 on the end of the lever is adapted to engage the pin 161, shown in Fig. 13 which is secured to the face of the plate 136, thereby preventing said plate from sliding until the latch is released in a manner which will later appear.

Pivotally mounted on the shaft 17 is a plate 172 (Figs. 9 and 10) having a slot 173 formed in its upper edge, a projection 174 formed on the rear end of the upper edge, and an upwardly-extending arm 175 formed on the forward end of the upper edge. The upper end of the arm is forked as shown at 176. A latch 177 is pivoted to the arm 175 at 178, and the forward end of the latch is bent at right angles to form the projection 179 adapted to engage the projection 174 formed on the rear end of the plate 172. A pin 180 is formed on or secured to one face of the latch, and a coiled spring 181 has one end secured to the pin 180 and the opposite end secured to the casting 26 to normally hold the latch down in the position shown in Fig. 9. A downwardly-extending lug 182 is formed on the lower edge of the latch, and has a laterally-extending pin 183 which is adapted to be received in the slot 173 on the upper edge of the plate 172. A pin 184 is formed on the face of the plate 136, shown in Fig. 4, and on the forward movement of the plate, this pin will engage the right-angle extension 179 on the latch and raise that end of the latch. The extension is on an incline so as to be raised by the pin. When sliding the plate in the opposite direction, the pin will engage the top of the extension 179, draw on the latch and swing the plate 172 on its pivot, thereby swinging the arm 175 of the plate, for operating mechanism to be later described.

Pivoted upon the shaft 58 (see especially Figs. 9, 12 and 24) is a pawl 185 which has a pawl 186 pivotally connected thereto. The pawl 186 has a laterally-extending arm 187, which is adapted to be received in a notch 188 formed in the upper edge of a bar 189. A pin 190 is carried by the pawl 185 and extends through the pawl 186 and bar 189, thereby pivotally connecting the pawl 186 between the pawl 185 and bar 189. An arm 191 is secured to the shaft 58, on the opposite side of the bar 189, and the upper end is cut to form the shoulders 192 and 193. The arm 187 of the pawl 186 is adapted to normally rest upon the surface in front of the shoulder 192, but when the projection 79, on the disc or plate 78, engages said arm 191, it will swing the same and allow the arm 187 to drop upon the surface in front of the shoulder 193 to operate the counting discs in a manner to be later described. A coiled spring 194 normally holds the arm 187 down in proper position upon the arm 191. The pawls 185 and 186 are held against transverse movement on the shaft 58 by a sleeve 195 and collar 196, the collar being held upon the shaft by a screw 197.

A pawl 198 is carried upon the shaft 60 and has pivotally connected thereto, by means of a pin 199, a second pawl 200. The pin 199 also extends through the bar 189, adjacent the end thereof. The pawl 200 is provided with a laterally-extending arm 201, which is adapted to engage the end of an arm 202 of a construction similar to the construction of the arm 191 on the shaft 58. This arm 202 is formed at the top with shoulders 203 and 204 and normally the arm 201 will rest upon the surface in front of the shoulder 203. When the arm 202 is engaged by the projection 110' of the arm 109', the arm 201 will be drawn down on the surface in front of the shoulder 204 by the coiled spring 205. A pawl 206 is pivoted on the shaft 60 and is adapted to engage the gear 105 on the side of the counting wheel 95 to hold the wheel in normal position. One end of a coiled spring 207 is connected to one end of the pawl 206, and the opposite end connected to the shaft 59. A collar 208, with a set-screw 209 secures the several elements upon the shaft 60. As shown more particularly in Fig. 34 of the drawings an arm $a$ is pivotally mounted on the shaft 60 and is provided with a tooth $b$ to engage the ratchet wheel 98 and normally hold the disc 93 against accidental rotation.

A pin 210 is secured to the bar 189 and is adapted to be received in the forked end 176 of the arm 175. When the forked arm is operated, it in turn operates the bar 189, which operates the pawls to transfer from one counting wheel to the other. A detailed description of the operation will be given later.

A bar 211 (Figs. 1$a$, 12 and 30) having the bifurcated ends 212 and 213, is provided on the side of the casting 26 for sliding the auxiliary frame 53 on the studs 54 so as to throw the total day-counters into inoperative position. The bar is mounted on the side of the casting by screws 214 and 215 which pass through the bifurcated ends 212 and 213, respectively. A hook 216 extends from one face of the bar, adjacent the bifurcated end 215, and when the bar is reciprocated is adapted to engage the pin 56 and slide the auxiliary frame 53 on the studs 54. The end of the hook is bevelled so as to readily engage behind the pin 56. A bevelled projection 117 is formed on the upper edge of the bar, adjacent the bifurcated end 212, and is adapted to be engaged by the pin 218 on the key 219 to slide the bar. A coiled spring 220 has one end secured to the pin 218 and the opposite end secured to the screw 221 and normally holds the key up with the pin 218 out of engagement with the bevelled projection 117. When the key is pushed down, the pin 218 will engage the bevelled projection, slide the bar 211, and place the spring 220 under tension. The pin, when the key is depressed to its fullest extent, will be received in the notch 222 formed at the base of the projection 117, and will hold said key in lowered position against the action of the spring. It will be seen that the auxiliary frame 53 may be laterally moved with respect to the mechanism carried by the main frame in that the stud or projection 199 passes loosely through an opening in the bar 189 and is sufficiently long to allow the frame to move far enough to move the gear wheels associated with the counter wheels to be positioned out of the path of the adding rack gear teeth.

A disc 223 is secured on the outer end of the shaft 17 and is provided with a notch in its periphery and an outwardly-extending lip 224, as shown more particularly in Fig. 1$a$ of the drawings. A pawl 225 is pivoted to the casting 26, at 226, and this pawl is provided at one end with the projection 227 adapted to be normally received in the notch in the periphery of the disc and the opposite end is formed with the eye 228 receiving one end of the coiled spring 229 which has its opposite end secured to the bar 211 (Figs. 13 and 30). The shaft 17 and disc 223 are rotated and the projection 227 on the pawl will be raised from the notch in the disc. On the continued rotation thereof, the lip 224 on the disc will engage the projection 227 and raise the pawl into engagement with a pin 230 formed on the inner face of the bar 211. This will slide the bar until the pin 218 is disengaged from the notch 222, which will allow the spring 220 to raise the key 219. One edge of the key is provided with the notches 231 adapted to receive the sliding bolt 232 forming a part of the key lock 233. By this arrangement, the key may be locked either in raised or lowered position. When locked in raised position, the total day-counters cannot be thrown out, and when locked in lowered position, the total day-counters cannot be thrown in. In other words, the auxiliary frame will be locked either in or out.

The counter-wheel carrying frame 49 has the rearwardly extending arms 234, more clearly shown in Fig. 9, said arms having notches 235 to receive one end of the coiled spring 236. The opposite ends of the spring are secured to the frame as shown. These coiled springs normally hold the rear end of the frame in raised position.

Secured to that side of the casting 26 having the flange 27 is the printing or recording mechanism shown more particularly in Fig. 19. This printing or recording mechanism comprises a type wheel 237 and an inking wheel 238, with a ribbon 239 running therearound. A ratchet wheel 240 is secured to the inner side of the inking roller and is adapted to be engaged by the pivoted pawl 241 which is held in position by the spring 242. The inner face of the type wheel has a gear-wheel 243 secured thereto for a purpose which will later appear. If desired, any suitable form of a belt-tightener may be provided for placing the ribbon 239 under tension. A printing hammer 244 is pivotally connected to the casting at 245, and has a rubber block 246 (Figs. 2 and 18) set in the outer end. The hammer has an upwardly-projecting flange all around its edge, and the rubber block 246 does not extend the full width between the flanges. In other words, a space is left between the blocks and one side flange.

A plate 247 is slidably connected to the side of the casting by a screw or bolt 248 which passes through an elongated opening 249 in said plate. A rearward extension 250 is formed on the plate and rides on a screw or bolt 251, said extension also having a vertical arm 252 formed with the plate 253 extending parallel with but spaced from the plate 247. The plate 253 has teeth 254 formed on the upper edge and adapted to mesh with the gear-wheel 243 on the type wheel. Notches 255 are formed on the lower edge of the plate 253 to receive the flange of the hammer 244 when the hammer is raised to operative position. The plate 247 has teeth 256 on its lower edge to mesh with a gear wheel 257 secured to the shaft 148. A plate 258, having the elongated opening 259, is slidably mounted upon screws or bolts 260 which extend through the opening. A rearward extension 261 is formed on the end of the plate and the opening 259 extends therein. A slot 262 is also formed in the plate and at the rear end extends upwardly as shown at 263 and then rearwardly as shown at 264. This slot receives a pin secured to the inner side of the hammer 244 so that when the pin engages the portion 263 of the slot, the free end of the hammer will be raised and the rubber block 246 strike the type wheel.

Pivotally connected to the extension 261, of the plate 258, at 265, is the latch arm 266. The forward end of this latch arm is formed with the upwardly-extending projections 267 and 268, the top of the projection 267 being bevelled and the projection 268 being of greater height than the projection 267. These projections provide a recess for the reception of the pin 115 formed on the plate 116, shown in Fig. 11, which is received in the slot 21 in the operating lever 16. This pin extends through a slot formed in the frame. A coiled spring 270 is connected to the rear end of the latch arm to normally hold the opposite end in engagement with the pin 115. When the operating lever 16 is pulled forward the pin 115 will draw the latch 266 and plate 258 forward to operate the printing mechanism, the hammer 244 being raised as the pin secured to the hammer operates in the slot 262.

It is often desired to add on the machine without printing or recording, and for this purpose I provide means for throwing out of operation the hammer-operating mechanism. This consists of a bar or plate 271, more particularly shown in Fig. 21, having openings 272 and 273 adapted to receive the supporting screws 248 and 260, respectively. An upwardly-extending bevelled projection 274 is formed on the forward end of the bar, and a downwardly-extending bevelled projection 275 is formed on the rear end. The forward bevelled projection 274 is adapted to be engaged by a pin 276 formed on a key 277 slidably connected to the frame by a screw 278 which passes through an elongated opening 279 therein. When the key is depressed, it will slide the bar and the bevelled projection 275, on the rear end, will engage the projection 268 on the latch arm 266 and release the latch arm from engagement with the pin 115. This allows the plate 116 to slide without sliding the plate 258 and operating the hammer. When the key is released, it will be pulled upward by the spring 280, and upon the return of the plate 116, the pin 115 will ride over the bevelled projection 267, in the latch arm 266, and the parts will assume their original positions. When the pin 115 is disengaged from the latch 266, the operating lever 16 can be used for operating the adding counters without printing or recording. The key 277 is provided with a notch in its forward edge to receive the pivoted plate or latch 281 which locks the key, when desired, in lowered position. This latch will be provided with the upwardly-extending finger-piece 282 whereby it may be rotated. A pawl 283 is pivotally connected to the forward end of the plate 258, and the outer end is normally held upward by the coiled spring 284 which is also connected to a pawl 285 pivoted to the plate 258 and used for a purpose which will later appear. On the forward movement of the plate 258 the pawl 283 will engage the ratchet wheel 240, on the inking roller, and then on the rearward movement of the plate will rotate the inking roller and ribbon. The bar 271 is also provided with a lug or projection 286 which is adapted to be engaged by the pin 115 when the same is reaching its forward-most position, so as to release the bevelled projection 274 from the pin and allow the key to return to its raised position by the action of the spring 280. A pin 287 is secured to the outer face of the lug or projection 286 and has a coiled spring 288 secured thereto. This coiled spring normally holds the bar 271 rearwardly in a position so that the bevelled projection 274 may be readily engaged by the pin 276 on the key 277.

Secured to the side of the casting, and extending over the side flange 27, are the rods 289 and 290 (Figs. 2, 3, 12 and 19) adapted to receive the rolls of paper 291 and 292, respectively. Mounted on the rods and engaging the inner ends of the paper rolls are plates 293 which are held under tension by the coiled spring 294. One end of the spring engages the top of the flange 27, and the opposite end engages in an eye 295 on the plate, and as the paper is unwound from the rolls, the springs will be placed under slight tension and thereby hold the paper against too rapid unwinding.

Plates 296 are received on the rod, engage the outer ends of the paper rolls, and are held in position by thumb nuts 297. A sleeve 298 is also secured to the casting between and slightly above the rods 289 and 290, by means of the screw 299, and in operation the paper being withdrawn from the rolls will pass over the sleeve. A cylinder 300 is rotatably mounted adjacent the rear end of the casting and is provided with two longitudinally-extending grooves 301 and with a central longitudinally-extending bore. A rod 302, having the handle 303 on its outer end, is received in the central longitudinal bore, and a second rod 303' is secured to the handle extending parallel with the rod 302, and is adapted to be received in one of the longitudinally-extending grooves 301. Paper from the roll 292 is adapted to be wound upon the cylinder 300, and the end of the paper will be engaged by the rod 303' and held in the groove 301. A ratchet wheel 304 is secured to the inner end of the cylinder 300. An arm 305 is loosely mounted on the cylinder shaft and has a spring-pressed pawl 306 pivoted thereto and adapted to engage the ratchet wheel 304. A pin or projection 307 is formed on that face of the arm 305 carrying the pawl 306 and adjacent the ratchet wheel 304 as more particularly illustrated in Fig. 19 of the drawings, and is adapted to be engaged by the lower edge of the extension 261 of the plate 258 for swinging the arm and pawl for rotating the ratchet wheel and cylinder and winding the paper thereon. As the plate 258 is moved forward, the pawl will rotate the cylinder, whereas on the rearward movement, the pawl will ride over the ratchet wheel. The arm 305 will be swung as the plate 258 moves forward by means of the spring 306' illustrated more particularly in Fig. 12 of the drawings. A sleeve 308 is secured above the cylinder 300 by a screw or rod 309, and the paper from the roll 291 is adapted to be drawn over this sleeve.

A rubber covered roll or cylinder 310 is secured to the side of the casting adjacent the sleeve 308, and has a knob or hand-hold 311 secured to the outer end for rotating by hand. A gear-wheel 312 is secured to the inner end of the roller, and a ratchet wheel 313 is secured to the roller shaft and spaced from the gear-wheel. A pivoted pawl 314 is secured to the casting and is held in engagement with the ratchet wheel 313 by means of the coiled spring 315. This pawl 314 allows the roller or cylinder 310 to be rotated only in one direction. The ratchet wheel 313 is also adapted to be engaged by the pawl 285 on the return movement of the plate 258 and thus rotate the ratchet and roller. A plate 316 is secured to the casting and extends over the flange 27. This plate has proper openings for the paper to pass therethrough and on the rear end is pivoted a roller carriage 317 carrying the rubber covered roller or cylinder 318. The carriage is held up by a suitable spring and normally engages the under side of the roller or cylinder 310. A gear-wheel 318' is secured to the inner end of the roller or cylinder 318 and is adapted to mesh with the gear-wheel 312 on the roller 310, so that the two rollers will be operated in unison. A semi-circular guard 319 is loosely mounted over the roller or cylinder 310 and one edge is serrated so as to allow the paper to be torn. A plate 320 is secured over the casting 26 so as to hold the several parts in position in the longitudinally-extending grooves. This plate will also be provided with the necessary openings for the key shanks. A housing 321 (Figs. 1 and 1a) is secured over the type wheel 237, inking roll 238, and ribbon 239. A blind 322 is secured to the sliding bolt 71 of the key controlled lock 72 and extends over the opening in the plate 320 through which the amount registered on the total day-counter may be read. This blind is of particular advantage in that the clerks or customers cannot read the amount of the total sales for the day and the same can only be read by the proprietor or other authorized person having a key for the lock.

Having described the detail parts making up the complete machine, I will now proceed to describe the operation and while I have only illustrated and described the mechanism operated by a single row of keys, it will be understood that any desired number of rows of keys might be used with their associated parts. In Fig. 17, I have illustrated three rows of keys with their associated parts, but in the other figures I have only illustrated mechanism for operation from one row of keys. The first step in the operation is to see that the paper is properly arranged for printing, or recording. The paper is drawn from the rolls 291 and 292 as more particularly illustrated in Fig. 2 of the drawings, passes around the sleeve 298, through a slot formed in the plate 316, and over the top of the plate with the left-hand marginal edge under the type wheel. The paper also passes between the rollers or cylinders 310 and 318 and the paper from the roll 291 passes over the sleeve 308 and when desired may be separated by the serrated edge of the guard 319 over the roller 310. The paper from the roll 292 passes down and is connected to the cylinder 300 and is adapted to be wound thereon. The paper from the roll 291 will be used as an original to be handed to the customer, whereas the paper from the roll 292 will be used as a carbon or duplicate to be wound on the cylinder 300, from which it may be taken for entering in a book or other permanent record. Any suitable form of carbon sheet may be placed between the two strips of paper, so that the duplicate may be made. The carbon sheet may be inserted between the sheets of paper, for each transaction or in other words when the clerk or other person starts to operate the machine, to enter the items upon the sales slips, he may insert the carbon sheet between the sheets of paper by merely separating them to a slight extent and the said carbon may be fed from between the sheets of paper when the sales slips are fed for the original to be torn off to be given to the purchaser and the carbon thereof to be wound upon the roll provided for that purpose. If it is not desired to use a separate carbon sheet the upper sheet of paper may have its lower face formed as a carbon surface. As stated in the objects of the invention, the machine gives the cost of each individual article of purchase as well as the total and the purchaser receives a slip bearing the cost of each individual article as well as the total, the total of the purchase will be noted on the slips by the salesman. He will be able to ascertain the total amount of the purchase from the amount added upon the counting wheels. This is different from the ordinary form of cash register which merely gives a check bearing the total. The plate 316 forms a convenient table for writing and the clerk will write on the paper, from the roll 291, an itemized list of the purchase. The keys in the rows will bear any desired designations of amount, but I will describe a row of nine keys bearing designations from one cent to nine cents. Say the first article on the list costs one cent, then the clerk will depress the first key in the row. The pin 45 on the key 44 will ride upon the inclined edge 152, of the projections 151 of the plate 149, as more particularly shown in Fig. 9, and will force the plate rearwardly. This will swing the bell-crank lever 156 on its pivot 157 so that the bevelled projection 158 will ride over the shaft or rod 57 and said shaft or rod will be received in the notch 159. This movement will lower the counter-carrying frame 49 and its associated parts into the position more clearly shown in Fig. 10, with the gear-wheels 76 and 96 meshing with the teeth 135 on the upper edge of the plate 130. The swinging of the bell-crank lever will lower the end of the arm 164, as shown in Fig. 15, so that the end 167 will be disengaged from the pin 161. It will be understood that as the bell crank lever 156 is swung that the projection 163 engaging the portion 166 of the arm 164 will swing the arm downwardly. The downward movement of the frame also disengages the gear-wheel 121, shown clearly in Fig. 11, from mesh with the rack 120 of the plate 116. The lowering of the frame also brings the pin 124 (Figs. 12 and 24) on the side of the frame 49, in position to operate in the guideway beneath the flange 123 in the plate 116. With the frame lowered, the handle 18 of the lever 16 is grasped and the lever drawn towards the front end of the machine. This operation of the lever will slide the plate 114 with its associated parts forward and the gear-wheel 118 and the shaft 17 will be rotated by the rack 119. The rotation of the shaft 17 will in turn rotate the gear-wheel 139, more clearly shown in Fig. 4, which meshes with the teeth 138 on the lower edge of the plate 136, and this slides the plate forward. As the plate 130 moves forward, the latch 142 engages the pins 134 and 141 of the extension 127 and plate 130, respectively and will move the plates 125 and 130 forward until such time as one of the steps 126 on the plate 125 engages the shank of the pin which is depressed. When the pin is engaged, the plate 125 and extension 127 will be held, and this will allow the pin 134 to ride over the end of the latch 142 and release the latch from the pin. With the latch released, the plate 136 is free to continue its forward movement through the full stroke of the lever 16. As the plate 130 moves forward, the teeth 135 on the upper edge, meshing with the gear-wheels 76 and 96 of the counters, will rotate the counters to register the amount of the depressed key. As the plate 136 moves forward, the pin 184 thereon engages the projection 179 (Fig. 9) on the end of the arm 177 and raises the same on the pivot 178. On the rearward movement of the plate, the pin engages the opposite or upper side of the projection 179, thereby swinging the plate 172 on its pivot and raises the arm 175. The raising of this arm operates the transfer mechanism of the counting wheels. On the forward movement of the plate 136, the pin 161 rides over the flange 160 on the arm 156, and when it reaches its forwardmost position, trips the bell-crank lever to disengage it from the rod 57. This allows the frame to rise and on the rearward movement of the plate, the pin 161 rides under the flange. Upon the rearward movement of the plate 116, the pin 124 on the side of the frame will ride in the guideway formed on the plate 116 by the flanges 122 and 123. When the plate has reached its full rearward movement, the frame will rise still further, so that the pin will be on a plane above the flange 122. The normal operation of the arm 175, on the plate 172, will merely throw the bar 189 forward and backward without transferring from one counting wheel to the other. When this action is taking place, the arms 187 and 201, of the pawls 186 and 200, respectively, will be resting upon those surfaces of the arms 191 and 202 in front of the shoulders 192 and 203 thereon. When the counting wheel 74 reaches the designation 9, the projection 79 on the disc 78 will engage beneath the arm 191 loosely mounted on the shaft 58, force the same back and allow the arm 187 to fall upon that surface in front of the shoulder 193.

The next movement of the bar 189 will allow the pawls 186 and 200 to engage the ratchet wheels 81 and 100 and transfer from one disc or counting wheel to the other. When the arms 187 and 201 of the pawls 186 and 200 respectively are positioned on the arms 191 and 202, in front of the shoulders 192 and 203 respectively, the pawls 186 and 200 will be held in raised position so that as the bar 189 is moved forward and backward they will not engage with the ratchet wheels 81 and 100 respectively. When thus held the unit counting wheels 74 and 93 only will be operated but when the projection 79 on the disc 78, as previously stated, engages beneath the arm 191 and the projection 110' of the arm 109' engages beneath the arm 202 they will throw their respective arms into such positions that the arms 187 and 201 will drop into position in front of the shoulders 193 and 204 of the arms 191 and 202 so that the pawls 186 and 200 will be lowered and when the bar 189 is moved forward the pawls will engage the ratchet wheels 81 and 100 respectively and thereby rotate the counting wheels 75 and 94, these counting wheels being what may be termed the tens wheels as distinguished from the unit wheels. It will thus be seen that the mechanism just described is used for transferring from the unit wheels to the tens wheels in the adding operation. The pawls 185 and 198 engage the gear-wheels 80 and 99 to prevent an overthrow of the counting wheels 75 and 94. When the counter wheel 93 on the shaft 61 reaches the designation 9 the arm 202 on the shaft 60 will be operated by the lug or projection 110' (Fig. 34) on the arm 109'. The transfer pawls 186 and 200 are held up in a different manner when resetting and the adding wheels come around to 9 or the transferring point. On the single purchase counter when the shaft 59 is rotated the cam 63 cams out the pawl 65 and rocks the shaft 58 to which the pawl is attached. In connection with the total day counting wheels when the counter wheel 93 on the shaft 61 is passing from the designation 9 to 0 the arm 202 will be thrown back by the lug or projection 110' on the arm 109' and trip the transfer pawl. During this operation the shaft 61 is held in such a position by the plunger 69 (Fig. 33) that the projection 109a is riding on the outside surface of the shaft. When resetting the shaft 61 is turned and the projection 109a drops into the recess of the shaft and the projection 110' does not come in contact with the arm 202 and therefore does not trip the transfer pawl and it is not necessary to have mechanism to hold up the transfer pawl. The operation above described may be repeated by depressing the various keys and the total amounts will be added upon the counting wheels. When the frame is raised, after the counting operation, the gear 121 will again mesh with the rack 120, and when the total amount of the purchase has been ascertained, and recorded, the counter wheels on the shaft 59 may be returned to 0 by the operation of the lever 16. The operation of the lever slides the plate 116 which rotates the gears 121 and 62 on the shaft 59. The groove 73 will engage the pawls 90 to rotate the counter wheels and reset them to 0. Those counter wheels on the shaft 61 are used for adding the total day receipts and are not reset to 0 until the end of the day or such other time as may be desired but the single purchase counting wheels are reset upon operation of the lever without depressing the keys. This can be done by releasing the lock, grasping the hand-hold 67, and operating the shaft as previously described.

When the plate 130 is slid, the rack extension 131 will rotate the gear-wheel 147 and shaft 148. This in turn operates the gear wheel 257 which operates the printing and recording mechanism in the manner as previously described. The paper is automatically fed through the rolls 310 and 318 by the operation of the pawl 285 engaging the ratchet wheel 313 and the duplicate or carbon is automatically rolled upon the cylinder 300 by the operation of the pawl 306 on the ratchet wheel 304. The total day-adder may be thrown out by sliding the auxiliary frame with the shaft 61 in the manner previously described, and the printing or recording mechanism can be thrown out, when desired, in the manner described. The shank 43 of the left hand key shown at the left in Fig. 4 is made of the length disclosed so that it will form a guide for the plate 125 slidable in the groove 34.

While I have described my machine as operated by the hand lever 16, it will be understood that, if desired, it might be operated by an electric motor so connected as to give the same general operation of parts. It will also be understood that such designating keys might be used as desired. There might be a designating key for each clerk in the store, a "No sales" key, a "Paid out" key, a "Change" key, a "Cash" key, and any number of similar keys. The printing wheel would have designations corresponding to those on the keys, so that the designations would be printed upon the paper.

Having fully described my invention, what I claim as new and desire to secure by Letters Patent of the United States, is:

1. A machine of the character described, comprising a base, a frame connected to the base for upward and downward movement, adding wheels mounted in the frame, a bar slidably mounted in the base and adapted to engage and lower the frame, bevelled projections formed on the bar, said projections having recesses at their lower ends, a key slidable in the base, a laterally-extending pin on the key adapted to engage one of the bevelled projections for sliding the bar, said pin adapted to be received in the recess at the lower end of said projection, means for rotating the adding wheels when the frame is lowered, and means for releasing the pin from the recess in the projection to allow the frame to rise.

2. A machine of the character described, comprising a base, a frame carried by the base for upward and downward movement, adding wheels mounted in the frame, a transversely-extending rod carried by the frame, a bar slidably mounted in the base, a catch operated by the bar adapted to engage the transverse rod for lowering the frame, means for sliding the bar, and means for rotating the adding wheels while the frame is lowered.

3. A machine of the character described, comprising a base, a frame carried by the base for upward and downward movement, adding wheels mounted in the frame, a transversely-extending rod carried by the frame, a bar slidably mounted in the base, a catch operated by the bar and provided with a bevelled projection adapted to engage the transverse rod for lowering the frame, means for sliding the bar, and means for rotating the adding wheels while the frame is lowered.

4. In an adding mechanism, a rotatable shaft, a plurality of adding wheels rotatably mounted on said shaft, means for rotating the adding wheels to add amounts thereon, a connector associated with each wheel to connect the same with said shaft to restore said wheel to zero when said shaft is rotated, a device for transferring units of one denomination to the wheel of the next higher denomination, and means for holding said transferring device out of operation, one of said connectors being formed and adapted for tripping said holding means upon the adding movement of its associated wheel but leaving said holding means undisturbed when said shaft is rotated to restore the wheels to zero.

5. A machine of the character described including a slidably mounted frame, adding wheels mounted in the frame, operating means for the adding wheels, a downwardly extending projection carried by the frame, and a bar slidable relative to the frame and adapted to be engaged with the downwardly extending projection to slide the frame to position the adding wheels out of operative relation with the operating means therefor.

6. A machine of the character described including a slidably mounted frame, adding wheels mounted in the frame, operating means for the adding wheels, a downwardly extending projection carried by the frame, and a bar slidable relative to the frame, said bar being formed with a hook on its end adapted to be engaged with the downwardly extending projection of the frame to slide the frame to position the adding wheels out of operative relation with the operating means therefor.

7. A machine of the character described including a slidably mounted frame, adding wheels mounted in the frame, operating means for the adding wheels, a downwardly extending projection carried by the frame, a bar slidable relative to the frame, a laterally extending hook formed on the bar and adapted to engage the downwardly extending projection, a beveled projection formed on the bar, and a key adapted to engage the beveled projection for sliding the bar to in turn slide the frame to position the adding wheels out of operative relation with the operating means therefor.

8. A machine of the character described including a shaft, adding wheels rotatably mounted on the shaft, means for transferring units of one denomination to the wheel of the next higher denomination, means for holding the transferring means out of operation, and common means connected to one of the adding wheels for tripping the holding means and for connecting the adding wheel to the shaft to be returned to zero.

9. A machine of the character described including a shaft, adding wheels rotatably mounted on the shaft, means for transferring units of one denomination to the wheel of the next higher denomination, means for holding the transferring means out of operation, and a member connected to one of the adding wheels for tripping the holding means and for connecting the adding wheel to the shaft to be returned to zero, said member including a portion normally projecting to engage the holding means as the wheel is rotated but withdrawn from the path of the holding means when resetting to zero.

10. In a machine of the character described, a movable frame, numeral wheels carried by the frame, means for operating the wheels, said means including two members, one of which is normally positioned to operate the wheels, a lever, connections between the lever and operating means for normally driving the wheels in one direction, amount keys, and means controlled by said amount keys for shifting the frame to engage the numeral wheels with the other member to operate the wheels in a computing direction.

In testimony whereof I hereunto affix my signature.

WILLIAM LEONARD PADEN.